United States Patent
Cheng et al.

(10) Patent No.: US 8,515,278 B2
(45) Date of Patent: Aug. 20, 2013

(54) PASSIVE OPTICAL NETWORKS WITH MODE COUPLING RECEIVERS

(75) Inventors: Ning Cheng, Sunnyvale, CA (US); Frank J. Effenberger, Freehold, NJ (US)

(73) Assignee: Futurewei Technologies, Inc., Plano, TX (US)

( * ) Notice: Subject to any disclaimer, the term of this patent is extended or adjusted under 35 U.S.C. 154(b) by 418 days.

(21) Appl. No.: 12/606,872

(22) Filed: Oct. 27, 2009

(65) Prior Publication Data
US 2010/0111537 A1    May 6, 2010

Related U.S. Application Data

(60) Provisional application No. 61/110,384, filed on Oct. 31, 2008.

(51) Int. Cl.
H04J 14/04    (2006.01)
H04J 4/00     (2006.01)
H04J 14/02    (2006.01)
G02B 6/255    (2006.01)

(52) U.S. Cl.
USPC .............. 398/44; 398/72; 398/82; 385/96

(58) Field of Classification Search
USPC ........................ 398/72, 82; 385/96
See application file for complete search history.

(56) References Cited

U.S. PATENT DOCUMENTS

| 5,129,019 | A | * | 7/1992 | Robberg et al. | ............ | 385/42 |
| 5,590,233 | A | * | 12/1996 | Carratt et al. | ............ | 385/100 |
| 6,307,242 | B1 | * | 10/2001 | Sugiyama | ............ | 257/432 |
| 6,525,853 | B1 | * | 2/2003 | Stuart | ............ | 398/115 |
| 6,629,784 | B1 | * | 10/2003 | Bricheno et al. | ............ | 385/96 |

(Continued)

FOREIGN PATENT DOCUMENTS

| CN | 1311497 A | 9/2001 |
| CN | 1350653 A | 5/2002 |

(Continued)

OTHER PUBLICATIONS

Darren P.Shea, Johhn E. Mitchell, Long-Reach optical Access Technologies,Oct. 2007, IEEE Network, pp. 5-11.*

(Continued)

Primary Examiner — Kenneth N Vanderpuye
Assistant Examiner — Amritbir Sandhu
(74) Attorney, Agent, or Firm — Conley Rose, P.C.; Grant Rodolph; John H. Scott, III

(57) ABSTRACT

An apparatus comprising a mode coupler configured to couple a plurality optical signals into a plurality of modes, and a receiver coupled to the mode coupler and configured to detect the modes to obtain the optical signals, wherein the optical signals are coupled from single mode fibers. Also disclosed is an apparatus comprising a plurality of single mode waveguides configured to transport a plurality of single mode signals, and a detector coupled to the single mode waveguides and configured to detect the single mode signals, wherein the single mode signals are substantially coupled without loss from the single mode waveguides to the detector. Also disclosed is a method comprising receiving a plurality of single mode optical channels, coupling the single mode optical channels into a multimode channel, and detecting the optical modes corresponding to the channels in the multimode channel.

19 Claims, 11 Drawing Sheets

(56) References Cited

U.S. PATENT DOCUMENTS

| | | | |
|---|---|---|---|
| 6,668,108 B1* | 12/2003 | Helkey et al. | 385/18 |
| 6,671,436 B2* | 12/2003 | Medved et al. | 385/39 |
| 6,990,278 B2* | 1/2006 | Vakili et al. | 385/46 |
| 7,327,914 B1* | 2/2008 | Kahn et al. | 385/15 |
| 7,499,651 B2* | 3/2009 | Bouda et al. | 398/71 |
| 7,630,643 B2* | 12/2009 | Niiho et al. | 398/79 |
| 2001/0024162 A1 | 9/2001 | Lee | |
| 2002/0027691 A1 | 3/2002 | Medved et al. | |
| 2003/0035166 A1* | 2/2003 | Zhang et al. | 359/118 |
| 2005/0196134 A1* | 9/2005 | Lee | 386/46 |
| 2007/0003183 A1* | 1/2007 | Shiba et al. | 385/14 |
| 2008/0031624 A1* | 2/2008 | Smith et al. | 398/71 |
| 2008/0317462 A1* | 12/2008 | Chi | 398/13 |
| 2009/0103922 A1* | 4/2009 | Lee et al. | 398/72 |
| 2010/0329670 A1* | 12/2010 | Essiambre et al. | 398/43 |
| 2010/0329671 A1* | 12/2010 | Essiambre et al. | 398/44 |
| 2011/0243490 A1* | 10/2011 | Ryf | 385/1 |
| 2013/0034356 A1* | 2/2013 | Luo et al. | 398/72 |

FOREIGN PATENT DOCUMENTS

| | | |
|---|---|---|
| CN | 1517731 A | 8/2004 |
| CN | 1725721 A | 1/2006 |
| CN | 101079673 A | 11/2007 |
| GB | 2311145 A | 9/1997 |
| WO | 2007133000 A1 | 11/2007 |

OTHER PUBLICATIONS

H. Kuwahara, M. Sasaki and N.Tokyo,Efficient coupling from semicinductor lasers into single-mode fibers with tapered hemispherical ends, Aug. 1, 1980, Applied optics vol. 19, No. 15, pp. 2578-2583.*

Akhil R.Shah, Rick C.J.Hsu, Alireza Tarighat,Ali H.Sayed and Bahram Jalali, Coherent optical MIMO Aug. 2005, Journal of lightwave technology, vol. 23 No. 8 pp. 2410-2419.*

Svistunov et al ; Selective mode lauching in a multimnode cahnnel waveguide by plannar coupler; Aug. 2004; Institute of physics publishing; p. 859-861.*

Ingersley et al; Waveguide photodiodes; Apr. 2004; pp. 1-86.*

Foreign Communication From a Related Counterpart Application—International Search Report, PCT/CN2009/074756, Feb. 4, 2010, 4 pages.

Foreign Communication From a Related Counterpart Application—Written Opinion, PCT/CN2009/074756, Feb. 4, 2010, 4 pages.

Miyazaki, Noriyuki, et al., "Hybrid TDM-WDM EPON Repeater," OFC/NFOEX 2008, paper NMD2.

Nesset, D. et al., "Demonstration of 100 km Reach Amplified PONs with Upstream Bit-Rates of 2.5 Gb/s and 10 GB/s," presented at the European Conference on Optical Communications, Stockholm, Sweden, 2004, Paper We2.6.3.

Suzuki, Ken-Ichi, et al., "Amplified Gigabit PON Systems," Journal of Optical Networking, vol. 6, Issue 5, May 2007, pp. 422-433.

International Telecommunications Union, ITUT-T, Telecommunication Standardization Sector of ITU, "Series G: Transmission Systems and Media, Digital Systems and Networks—Digital Sections and Digital Line System—Optical Line Systems for Local and Access Networks, Gigabit-Capable Passive Optical Networks (GPON): Reach Extension," G.984.6, Mar. 2008.

Foreign Communication From A Related Counterpart Application, European Application 09823093.1, Extended European Search Report dated Apr. 5, 2012, 9 pages.

Foreign Communication From A Counterpart Application, Chinese Application 200980126203.2, Chinese Office Action dated Oct. 30, 2012, 5 pages.

Foreign Communication From A Counterpart Application, Chinese Application 200980126203.2, Partial English Translation of Chinese Office Action dated Oct. 30, 2012, 6 pages.

Foreign Communication From A Counterpart Application, European Application 09823093.1, European Office Action dated Mar. 18, 2013, 7 pages.

\* cited by examiner

PASSIVE OPTICAL NETWORKS WITH MODE COUPLING RECEIVERS

CROSS-REFERENCE TO RELATED APPLICATIONS

The present application claims priority to U.S. Provisional Patent Application 61/110,384, filed Oct. 31, 2008 by Ning Cheng et al., and entitled "Passive Optical Networks with Mode Coupling Receivers," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The increase in Internet traffic and emerging multimedia applications, such as video on demand, high definition Television (TV), video conference, and interactive online games requires an increase in bandwidth of access networks. To satisfy the increase in bandwidth and support such applications, Time Division Multiplexing (TDM) Passive Optical Networks (PONs), such as Gigabit PONs (GPONs) and Ethernet PONs (EPONs), are currently deployed worldwide to potentially serve millions of users. Traditionally, the maximum transmission distance of a PON is less than or about 20 Kilometers (km) and the splitting ratio is from about 1:16 to about 1:64, as defined in International Telecommunication Union (ITU) Telecommunication Standardization Sector (ITU-T) and Institute of Electrical and Electronics Engineers (IEEE) standards. The splitting ratio is the ratio of one central office equipment, e.g. an Optical Line Terminal (OLT), to a plurality of user equipments, e.g. Optical Network Terminals (ONTs).

Recently, there has been interest in long-reach and large splitting ratio PONs that have transmission distances larger than about 20 km and splitting ratios larger than about 1:64. In such long-reach and large splitting ratio PONs, the number of central offices, which can serve the same quantity of user terminals, can be substantially reduced. Additionally, the hierarchy of the PON can be simplified, the equipment and operation cost can be reduced, and the quality of service for real-time traffic (e.g. video on demand) can be improved due to the reduced number of hops in the system. Accordingly, ITU-T has defined a standard (ITU-T G.984.6) for GPONs with reach extension. In this standard, optical amplification and/or Optical-Electrical-Optical (OEO) regeneration are considered for long-reach PON implementations. Using optical amplifiers or optical regenerators, long-reach PONs having transmission distances up to about 100 km have been demonstrated. However, the optical amplifiers or generators are active equipment that can increase the cost and/or maintenance requirements in the system, which may be unattractive for large scale deployment. Achieving long-reach PONs without optical amplifiers or regenerators remains attractive but difficult.

SUMMARY

In one embodiment, the disclosure includes an apparatus comprising a mode coupler configured to couple a plurality of optical signals into a plurality of modes, and a receiver coupled to the mode coupler and configured to detect the modes to obtain the optical signals, wherein the optical signals are coupled from single mode fibers.

In another embodiment, the disclosure includes an apparatus comprising a plurality of single mode waveguides configured to transport a plurality of single mode signals, and a detector coupled to the single mode waveguides and configured to detect the single mode signals, wherein the single mode signals are substantially coupled without loss from the single mode waveguides to the detector.

In yet another embodiment, the disclosure includes a method comprising receiving a plurality of single mode optical channels, coupling the single mode optical channels into a multimode channel, and detecting the optical modes corresponding to the channels in the multimode channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and apparatus for deploying long-reach/large splitting PONs without using optical amplifiers and regenerators. The long-reach/large splitting PON systems comprise a low-loss mode coupling receiver, for instance at the OLT, which may be configured to increase the maximum transmission distance and/or the splitting ratio of the PONs. The PON systems may comprise a plurality of different low-loss mode coupling receivers, which may be based on different schemes for coupling a plurality of single mode optical channels into a multimode optical channel. The different low-loss mode coupling receivers may include a fiber coupler, a waveguide coupler, a fused fiber coupler, an improved fused fiber coupler, a fused fiber-lens coupler, an improved fused fiber-lens coupler, a prism coupler, and a waveguide photodiode coupler. The low-loss mode coupling receivers may improve the power budget in long-reach and long-splitting PON deployment.

Figure 1:
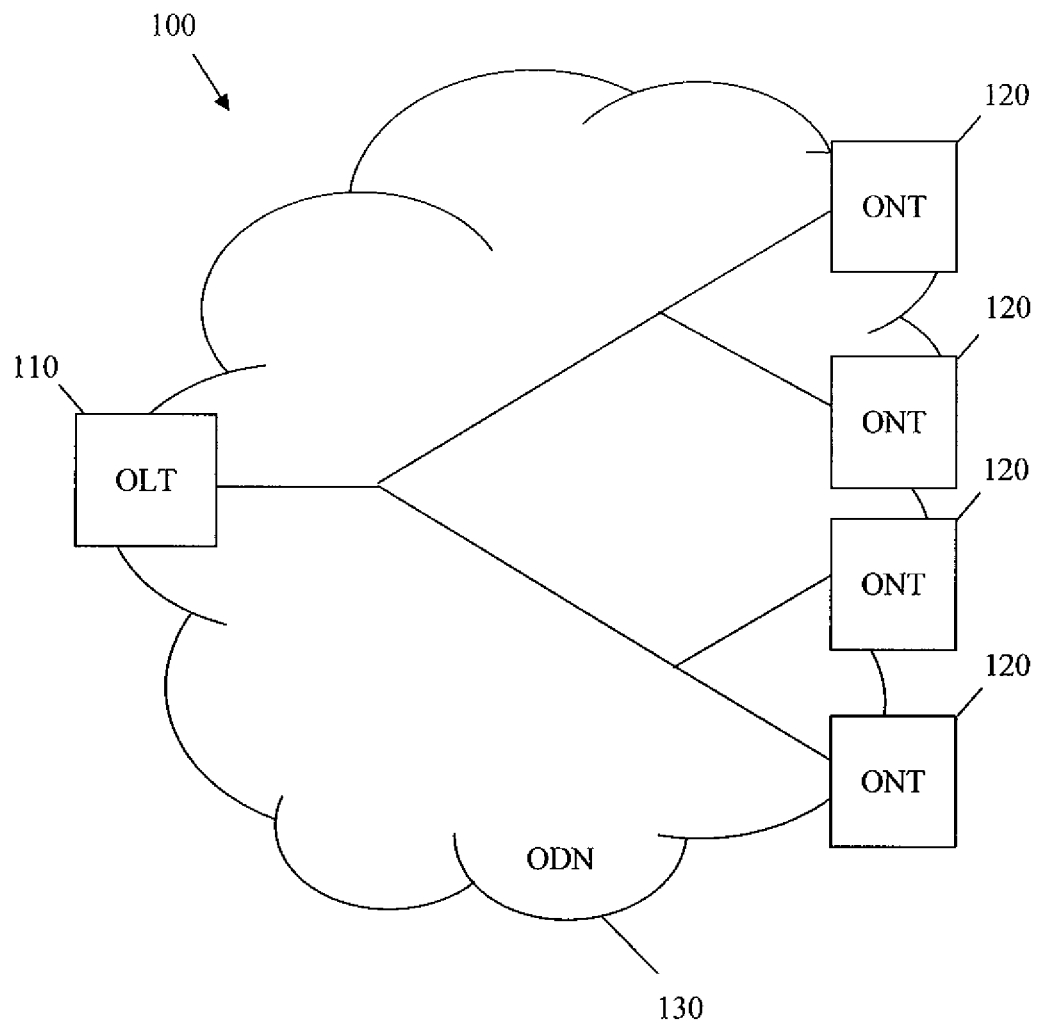
FIG. 1 is a schematic diagram of an embodiment of a PON.

FIG. 1 illustrates one embodiment of a PON 100. The PON 100 comprises an OLT 110, a plurality of ONTs 120, and an ODN 130, which may be coupled to the OLT 110 and the ONTs 120. The PON 100 may be a communications network that does not require any active components to distribute data between the OLT 110 and the ONTs 120. Instead, the PON 100 may use the passive optical components in the ODN 130 to distribute data between the OLT 110 and the ONTs 120. In an embodiment, the PON 100 may be a Next Generation Access (NGA) system, such as a ten gigabit per second (Gbps) GPON (XGPON), which may have a downstream bandwidth of about ten Gbps and an upstream bandwidth of at least about 2.5 Gbps. Alternatively, the PON 100 may be any Ethernet based network, such as an EPON defined by the IEEE 802.3ah standard, a 10 Gigabit EPON as defined by the IEEE 802.3av standard, an asynchronous transfer mode PON (APON), a broadband PON (BPON) defined by the ITU-T G.983 standard, a GPON defined by the ITU-T G.984 standard, or a wavelength division multiplexed (WDM) PON (WPON), all of which are incorporated herein by reference as if reproduced in their entirety.

In an embodiment, the OLT 110 may be any device that is configured to communicate with the ONTs 120 and another network (not shown). Specifically, the OLT 110 may act as an intermediary between the other network and the ONTs 120. For instance, the OLT 110 may forward data received from the network to the ONTs 120, and forward data received from the ONTs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking/Synchronous Digital Hierarchy (SONET/SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

In an embodiment, the ONTs 120 may be any devices that are configured to communicate with the OLT 110 and a customer or user (not shown). Specifically, the ONTs 120 may act as an intermediary between the OLT 110 and the customer. For instance, the ONTs 120 may forward data received from the OLT 110 to the customer, and forward data received from the customer onto the OLT 110. Although the specific configuration of the ONTs 120 may vary depending on the type of PON 100, in an embodiment, the ONTs 120 may comprise an optical transmitter configured to send optical signals to the OLT 110 and an optical receiver configured to receive optical signals from the OLT 110. Additionally, the ONTs 120 may comprise a converter that converts the optical signal into electrical signals for the customer, such as signals in the Ethernet or asynchronous transfer mode (ATM) protocol, and a second transmitter and/or receiver that may send and/or receive the electrical signals to a customer device. In some embodiments, ONTs 120 and optical network units (ONUs) are similar, and thus the terms are used interchangeably herein. The ONTs 120 may be typically located at distributed locations, such as the customer premises, but may be located at other locations as well.

In an embodiment, the ODN 130 may be a data distribution system, which may comprise optical fiber cables, couplers, splitters, distributors, and/or other equipment. In an embodiment, the optical fiber cables, couplers, splitters, distributors, and/or other equipment may be passive optical components. Specifically, the optical fiber cables, couplers, splitters, distributors, and/or other equipment may be components that do not require any power to distribute data signals between the OLT 110 and the ONTs 120. Alternatively, the ODN 130 may comprise one or a plurality of active components, such as optical amplifiers. The ODN 130 may typically extend from the OLT 110 to the ONTs 120 in a branching configuration as shown in FIG. 1, but may be alternatively configured in any other point-to-multi-point configuration.

The PON 100 may have a maximum transmission distance less than or equal to about 20 km and a splitting ratio less than or equal to about 1:64. For instance, a plurality of splitters may be used in the ODN 130 to split each branch of fiber into a plurality of branches until reaching such splitting ratio. Typically, to increase the splitting ratio and increase the maximum transmission distance of the PON 100, a plurality of optical amplifiers and/or regenerators may be added, for instance to couple some of the fiber cables in the ODN 130 and thus boost the optical signal power for longer reach and/or larger splitting ratio. However, such combination of splitters and optical amplifiers (or regenerators) may increase the cost of deployment, which may not be desirable or practical.

Figure 2:
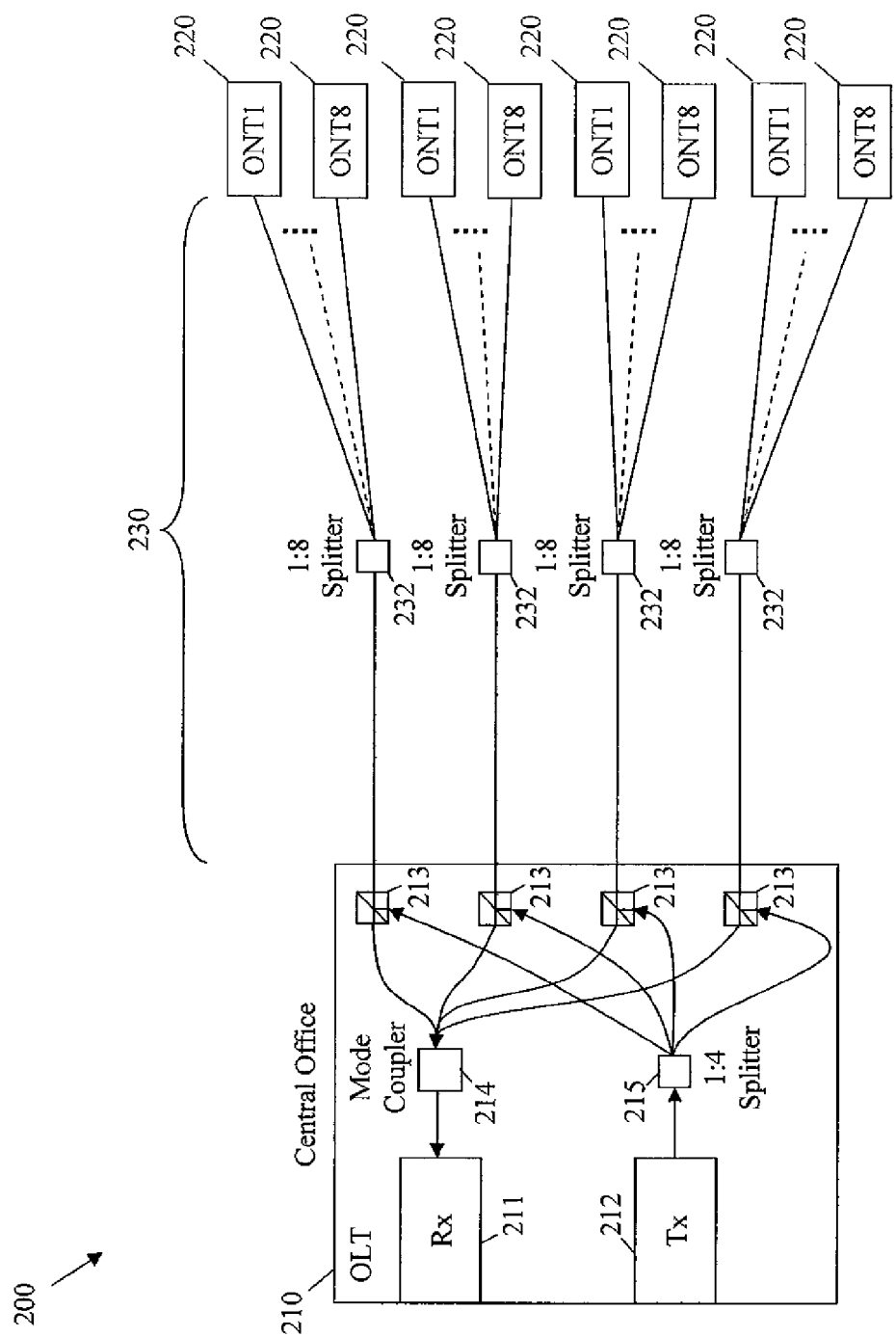
FIG. 2 is a schematic diagram of an embodiment of a long-reach/large splitting PON.

FIG. 2 illustrates one embodiment of a long-reach/large-splitting PON 200, which may have an increased maximum transmission distance, e.g. greater than about 20 km. Additionally or alternatively, the long-reach/large-splitting PON 200 may have an increased splitting ratio, e.g. greater than about 1:64. Specifically, the long-reach/large-splitting PON 200 may be configured for longer maximum transmission distance and/or larger splitting ratio without using an optical amplifier or regenerator in the system. The long-reach/large-splitting PON 200 may comprise an OLT 210, a plurality of ONTs 220, and an ODN 230 coupled to the OLT 210 and the ONTs 220. Similar to the PON 100, the long-reach/large-splitting PON 200 may be a GPON, EPON, APON, BPON, WPON, or NGA system.

Similar to the OLT 110, the OLT 210 may be configured to communicate with the ONTs 220 and another network (not shown) and may act as an intermediary between the other network and the ONTs 220. The OLT 210 may comprise a receiver (Rx) 211, a transmitter (Tx) 212, and a plurality of optical signal separators 213. The optical signal separators may be any devices configured to separate upstream and downstream optical signals at the OLT 210. For instance, the optical signal separators 213 may be WDM diplexers or optical circulators that receive the upstream optical signals from the ODN 230 via a plurality of first fibers and forward the upstream optical signals to the RX 211 via a plurality of second fibers. The first fibers may be configured for bidirectional transmission from and to the ONTs 220 and the second fibers may be single mode fibers. The optical separators 213 may also receive the downstream optical signals from the Tx 212 via a third plurality of fibers and forward the downstream optical signals to the ODN 230 via the first fibers.

Additionally, the OLT 210 may comprise a mode coupler 214 coupled to the Rx 211 and the optical signal separators 213, and an OLT splitter 215 coupled to the Tx 212 and the optical signal separators 213. The mode coupler 214 may be any device configured to couple the upstream optical signals from the ONTs 220 into the Rx 211. The upstream optical signals may be forwarded to the Rx 211 via the ODN 230, which may be coupled to the optical signals separators 213. Specifically, the mode coupler 214 may couple the upstream optical signals into different optical modes, for instance similar to a space division multiplexing scheme. The coupled upstream optical signals may be forwarded to the Rx 211 and hence detected. The Rx 211 may detect a plurality of coupled modes or channels corresponding to the upstream optical signals. Coupling the upstream optical signals into different optical modes may reduce the insertion loss for each optical signal and thus improve detection, in comparison to conventional receiver schemes that use optical splitters. Reducing the insertion loss in the optical detection scheme may increase the power budget of the system for upstream transmission, which may extend the maximum transmission distance for the upstream optical signals from the ONTs 220 to the OLT 210. Additionally, increasing the power budget may allow a larger splitting ratio for serving more ONTs 220 in the system. As such, using the mode coupler 214 may improve the long-reach and splitting ratio capabilities of the system without adding optical amplifiers or regenerators.

The OLT splitter 215 may be any device configured to split the downstream optical signals from the Tx 212 into a plurality of downstream signal copies, which may be forwarded to the optical signals separators 213. The optical signal separators 213 may forward the downstream optical signals to the ODN 230. In comparison to the increase in power budget provided by the mode coupler 214, the OLT splitter 215 may provide no or less substantial increase in the power budget for downstream transmission. However, the downstream optical signals may be transmitted at a wavelength equal to about 1490 nanometers (nm), which may suffer lower fiber losses than the upstream optical signals (e.g. at about 1310 nm). Therefore, the long-reach and splitting ratio requirements of the system for downstream optical signals may be lower than the requirements for upstream optical signals. Hence, using the combination of the mode coupler 214 and the OLT splitter 215 may provide an improved overall long-reach and splitting ratio transmission in the system.

The ODN 230 may comprise a plurality of ODN splitters 232 that receive the downstream optical signals form the OLT 210. The ODN splitters 232 may be any devices configured to split the downstream optical signals from the OLT 210 into a plurality of downstream signal copies. The downstream signal copies may be forwarded to the ONTs 220, which may be configured similar to the ONTs 130. Specifically, each of the ODN splitters 232 may be coupled to the optical signal separators 213 via the first fiber cables, e.g. bidirectional fiber cables, and to a plurality of corresponding ONTs 220 via another plurality of fiber cables similar to the first fiber cables. In an embodiment, the ONTs 220 may be coupled to each ODN splitter 232 via a plurality of fiber cables, which may be coupled in parallel in a single aggregate cable. In an alternative embodiment the ODN splitters 232 may be positioned at the central office with the OLT 210 instead of the ODN 230.

In an embodiment, the OLT 210 may comprise about four optical signal separators 213, which may be each coupled to the mode coupler 214 and the OLT splitter 215, as shown in FIG. 2. Accordingly, the ODN 230 may comprise about four ODN splitters 232, which may be each coupled to one of the optical signal separators 213 via a different fiber cable. Each ODN splitter 232 may also be coupled to up to about eight ONTs 220 (e.g. ONT1 to ONT8). As such, the long-reach/large-splitting PON 200 may have a splitting ratio of about 1:32. In other embodiments, the long-reach/large-splitting PON 200 may have a larger splitting ratio, such as greater than or equal to about 1:64. For instance, each of about four ODN splitters 232 may be coupled to at least about 16 ONTs 220 via separate fiber cables.

Further, the architecture of the long-reach/large-splitting PON 200 may be used to allow a plurality of PONs to share a single OLT port. For example, the OLT 210 may be coupled to a plurality of PONs, which may each comprise an ODN similar to the ODN 230 and a plurality of ONTs similar to the ONTs 220. The OLT 210 may be deployed during an initial PON roll-out phase or during an upgrade phase for evolving towards next generation PONs. In the initial roll-out or upgrade phase, there may be relatively few users in each PON. Accordingly, a number of PONs may share a single OLT port, which may save initial deployment cost. Additional OLT ports may then be added when the number of users in each PON increases.

Table 1 shows a plurality of PON parameters for a PON configuration that may be used in the long-reach/large-splitting PON 200. The PON parameters may correspond to the upstream optical signals and the downstream optical signals. The long-reach/large-splitting PON 200 may have a maximum transmission distance equal to about 60 km and a splitting ratio equal to about 1:32. For instance, the splitting ratio may be equal to about 1:4 for each of the mode coupler 214 and the OLT splitter 215 and may be equal to about 1:8 for each of the ODN splitters 232. For the upstream optical signals, the PON parameters may comprise an ONT transmitter power (e.g. for any of the ONTs 220) and an OLT receiver sensitivity (e.g. for the Rx 211). The ONT transmitter power may be equal to about two decibels per milliwatt (dBm) and the OLT receiver sensitivity may be equal to about −32 dBm. The upstream signals' parameters may also comprise a fiber loss corresponding to about 60 km distance at about 1310 nm wavelength (for upstream transmission), a first splitter loss (e.g. in the ODN splitters 232), and a mode coupler loss (e.g. assuming about one decibel (dB) insertion loss). The fiber loss may be equal to about 21 dB, the first splitter loss may be equal to about ten dB, and the mode coupler loss may be equal to about one dB. Additionally, a power budget margin for upstream transmission may be calculated based on at least some of the remaining parameters. The power budget margin may be equal to about two dB.

Similarly, the PON parameter values for the downstream optical signals may comprise an OLT transmitter power (e.g. for the Tx 212), a fiber loss corresponding to about 60 km distance at about 1490 nm wavelength (for downstream transmission), a first splitter loss (e.g. in the ODN splitter 232 having about 1:8 splitting ratio), a second splitter loss (e.g. for the OLT splitter 215 having about 1:4 splitting ratio), and an ONT receiver sensitivity (e.g. for any of the ONTs 220). For the downstream optical signals, the OLT transmitter power may be equal to about three dBm, the fiber loss may be equal to about 15 dB, the first splitter loss may be equal to about ten dB, the second splitter loss may be equal to about seven dB, and the ONT receiver sensitivity may be equal to about −32 dBm. As such, the calculated power budget margin for downstream transmission may be equal to about three dB, which may be slightly higher than for upstream transmission. Thus, providing a low-loss mode coupling receiver for upstream transmission and conventional detection for downstream transmission may be sufficient to improve the overall long-reach and/or splitting ratio capabilities of the system.

TABLE 1

| Upstream | | Downstream | |
|---|---|---|---|
| ONT transmitted power | 2 dBm | OLT transmitted power | 3 dBm |
| 60 km fiber loss at 1310 nm | 21 dB | 60 km fiber loss at 1490 nm | 15 dB |
| Splitter loss (1:8) | 10 dB | Splitter loss (1:8) | 10 dB |
| Mode coupler loss | 1 dB | Splitter loss (1:4) | 7 dB |
| OLT receiver sensitivity | −32 dBm | ONT receiver sensitivity | −32 dBm |
| Power budget margin | 2 dB | Power budget margin | 3 dB |

In an embodiment, the long-reach/large-splitting PON 200 may be configured to support communications for about 64 ONTs 220, e.g. may have a splitting ratio equal to about 1:64. For example, the splitting ratio of the mode coupler 214 may be equal to about 1:2 and the splitting ration of the ODN splitters 232 may be equal to about 1:32. Accordingly, the mode coupler 214 may be coupled to about two ODN splitters 232, which may be each coupled to about 32 ONTs 220. Alternatively, the splitting ratio of the mode coupler 214 may be equal to about 1:4 and the splitting ration of the ODN splitters 232 may be equal to about 1:16. In another embodiment, the mode coupler 214 may have a splitting ratio equal to about 1:8 and the ODN splitters 232 may also have a splitting ratio equal to about 1:8. In other embodiments, the long-reach/large-splitting PON 200 may have a splitting ratio greater than about 1:64, e.g. may support more than about 64 ONTs 220. For example, the splitting ratio of the mode coupler 214 may be equal to about 1:3 or about 1:4 and the splitting ratio of the ODN splitters may be equal to about 1:32. Alternatively, the mode coupler 214 may have a splitting ratio equal to about 1:8 and the ODN splitters 232 may have a splitting ratio equal to about 1:16 or about 1:32. Other combinations of mode coupler 214 and ODN splitters 232 may be used to provide a combined splitting ration greater than about 1:64.

Figure 3:
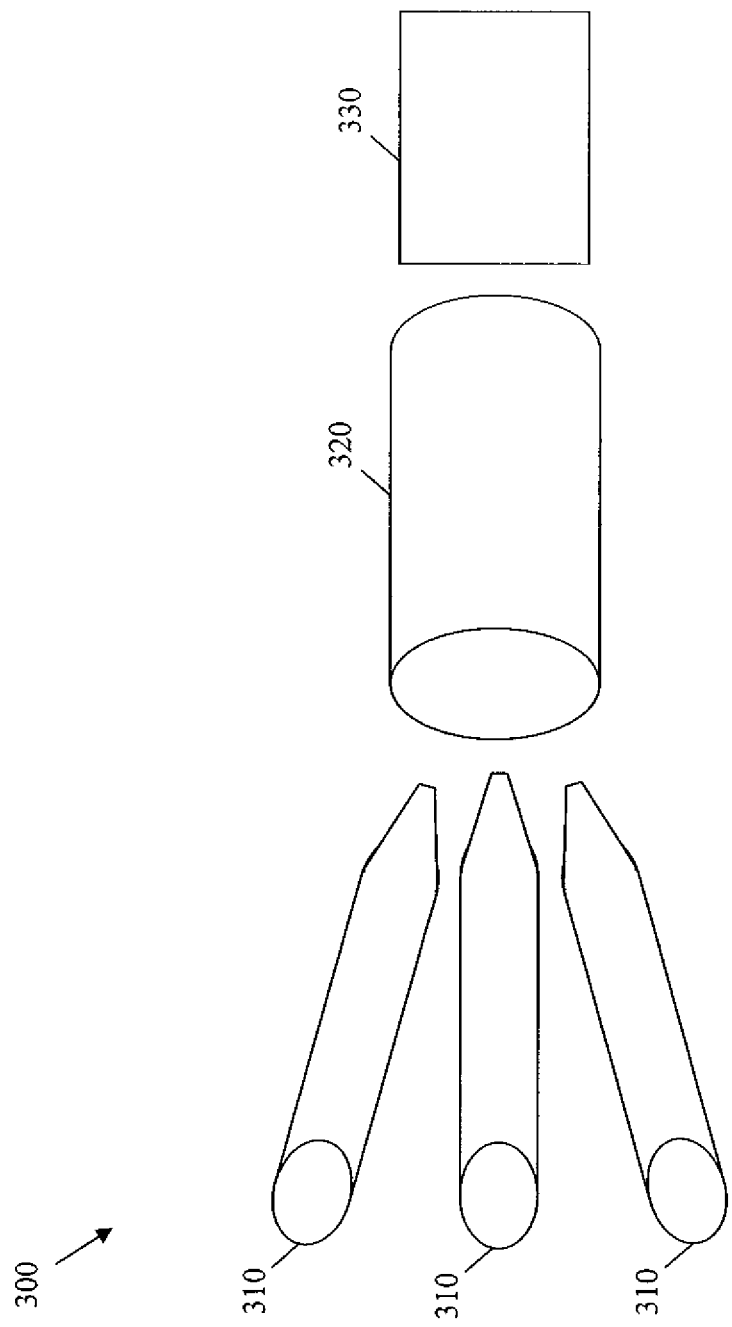
FIG. 3 is a schematic diagram of an embodiment of a fiber coupler.

FIG. 3 illustrates an embodiment of a fiber coupler 300, which may be a low-loss mode coupling receiver used for mode coupling and detection in a long-reach PON. For instance, the fiber coupler 300 may comprise at least some of the mode coupling and detection components of the long-reach/large-splitting PON 200, e.g. a plurality of components of the mode coupler 214 and the Rx 211. Accordingly, the fiber coupler 300 may receive a plurality of upstream optical signals from the ONTs, couple the signals into different optical modes, and detect the signal in all the modes. The fiber coupler 300 may have lower insertion loss for each optical signal than conventional detection schemes and therefore may increase the power budget of the system for upstream transmission. The fiber coupler 300 may comprise a plurality of first fibers 310, a second fiber 320, and a detector 330.

The first fibers 310 may be single mode fibers and may transport an upstream optical signal from one of the ONTs. Alternatively, each of the first fibers 310 may transport a plurality of upstream optical signals from a plurality of ONTs, e.g. from the ONTs 220 using the ODN splitters 232. Each of the first fibers 310 may comprise a tapered tip at one end, which may be coupled to (e.g. positioned in close proximity to) one end of the second fiber 320. Additionally, the first fibers 310 may each be tilted at a corresponding angle with respect to the orientation of the second fiber 320. To reduce the insertion loss of the first fibers 310, the angle of each first fiber 310 may be within the acceptance angle of the second fiber 320. The tapered tips, their corresponding angles, and the distance between the edges of the first fibers 310 and the second fiber 320 may be configured to improve optical mode coupling between the first fibers 310 and the second fiber 320. For instance, the dimensions and orientation of the tapered tips and the distance between the tapered tips and the second fiber 320 may be designed based on the diameters of the first fibers 310 and the second fiber 320 to increase the amount of optical energy that can be coupled between the fibers and reduce the insertion loss of the fibers. Further, the quantity of first fibers 310 that may be coupled to the second fiber 320 may be based on the diameters of the first fibers 310 and the second fiber 320. For instance, about three or about four first fibers 310 may be coupled to the second fiber 320 to provide about 1:3 or about 1:4 splitting ratio, respectively. In an embodiment, the tapered tips of the first fibers 310 may have a lens shape to further improve optical coupling between the first fibers 310 and the second fiber 320.

The second fiber 320 may have a diameter that is larger than the combined first fibers 310 and may have a length that is smaller than the first fibers 310. For instance, the diameter of the core of the second fiber 320 may be larger than the cross section area of the combined cores of the first fibers 310. For instance, the second fiber 320 may be long enough (e.g. about a few centimeters) to allow the propagation of the coupled modes from the first fibers 310 to the detector 330. The detector 330 may be an optical detector, also referred to as photosensor or photodetector, such as a photodiode, an avalanche photodiode (APD), or a photocell. The detector 330 may convert the optical signals corresponding to the optical modes into electrical signals that may be further processed for communication purposes. In some embodiments, the fiber coupler 300 may comprise at least one lens (not shown), which may be positioned between the first fibers 310 and the second fiber 320 to further improve optical coupling between the fibers. Additionally, a silicon bench comprising a plurality of V-shaped groves may be used to align the first fibers 310 and the second fiber 320.

Figure 4:
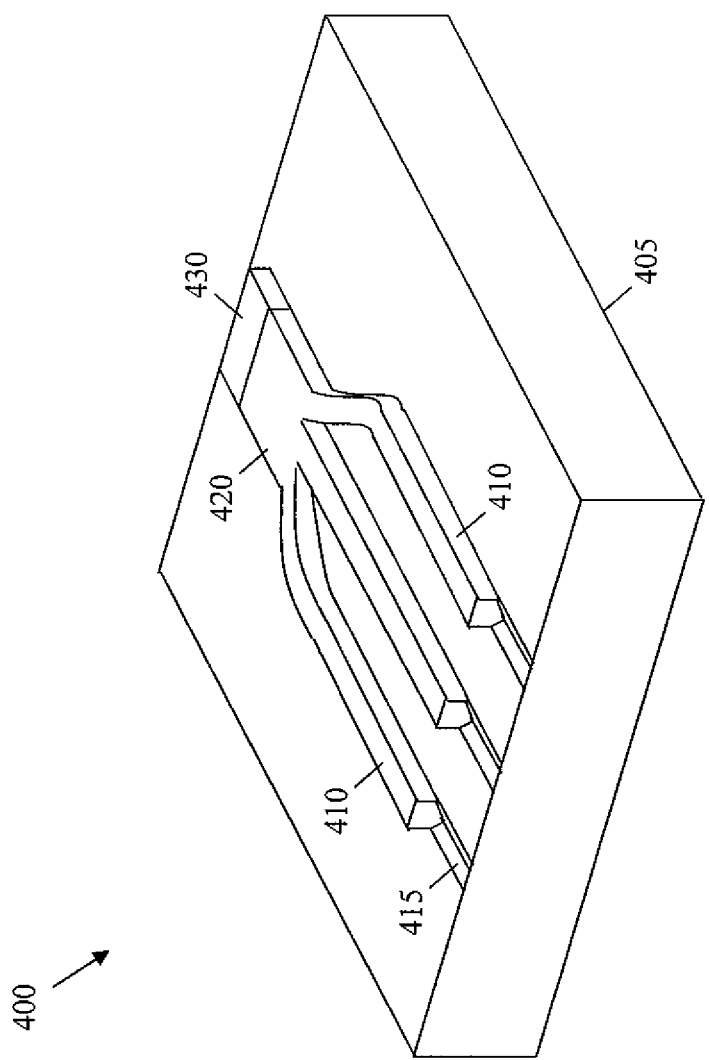
FIG. 4 is a schematic diagram of an embodiment of a waveguide coupler.

FIG. 4 illustrates an embodiment of a waveguide coupler 400, which may be another low-loss mode coupling receiver used for mode coupling and detection in a long-reach PON. For instance, the waveguide coupler 400 may comprise at least some of the mode coupling and detection components in the mode coupler 214 and the Rx 211. Similar to the fiber coupler 300, the waveguide coupler 400 may receive a plurality of upstream optical signals from the ONTs, couple the signals into different optical modes, and detect the signals. The waveguide coupler 400 may comprise a substrate 405, a plurality of first waveguide channels 410, a plurality of corresponding grooves 415, a second waveguide channel 420 coupled to the first waveguide channels, and an integrated detector 430. The waveguide coupler 400 may be obtained using standard fabrication processes, e.g. including deposition, exposure, development, etching, and/or bonding, and using semiconductor and dielectric materials.

The substrate 405 may be a semiconductor chip, such as a Silicon (Si) substrate used in the fabrication of integrated circuit and microelectronics. The substrate 405 may be tabular, rectangular, or disk shaped. The substrate 405 may provide a platform to support, hold, and couple the remaining components of the waveguide coupler 400. The first waveguide channels 410, the second waveguide channel 420, and the detector 430 may be positioned on top of the substrate 405. The grooves 415 may also be etched on the top surface of the substrate 405 and may be aligned with the first waveguide channels 410. For instance, each groove 415 may be etched under one of the first waveguide channels 410. The grooves 415 may also extend beyond the length of the first waveguide channels 410 to one edge of the substrate 405. As such, the grooves 405 may allow coupling between the first waveguide channels 410 and a plurality of fibers that may be positioned into the grooves 415 and that transport upstream optical signals from the ONTs. For instance, the grooves 410 may be V-shaped grooves that provide precise alignment control between the fibers and the first waveguide channels 410.

The first waveguide channels 410 may be single mode waveguides and the second waveguide channel 420 may be a multimode waveguide. The first waveguide channels 410 and the second waveguide channel 420 may be integrated or fused on top of the substrate 405. The first waveguide channels 410 may each be configured for single mode propagation and may transport one of the upstream optical signals to the second waveguide channel 420. The second waveguide channel 420 may have a larger width than any of the first waveguide channels 410 and may be configured to couple the upstream optical signals from the first waveguides channels 410 into a plurality of propagation modes (e.g. distribution of the optical field). The propagation modes may be transverse propagation modes, e.g. transverse electric (TE) modes, transverse magnetic TM modes, and/or transverse electromagnetic (TEM) modes. The second waveguide channel 420 and the detector 430 may also be integrated or fused on top of the substrate 405. The detector 430 may be a photodiode or a waveguide photodiode configured to convert the optical signals of the different propagation modes in the second waveguide channel 420 into a plurality of corresponding electric signals.

Similar to the first fibers 310, the first waveguide channels 410 may each be tilted at a corresponding angle with respect to the orientation of the second waveguide channel 420 to improve optical coupling and reduce insertion loss. The quantity of first waveguide channels 410 that may be coupled to the second waveguide channel 420 may be based on the widths of the first waveguide channels 410 and the second waveguide channel 420. For example, there may be about three or about four first waveguide channels 410 couple to the second waveguide channel 420. The integration or fusion of the first waveguide channels 410 and second waveguide channel 420 may also improve the optical coupling between the waveguide channels and reduce the insertion loss. Therefore, the waveguide coupler 400 may be a low loss waveguide coupler, which may be used in the long-reach PON to increase the power budget for upstream transmission. Additionally, integrating or fusing the second waveguide coupler 420 and the detector 430 may further increase overall optical coupling and reduce insertion losses.

Figure 5:
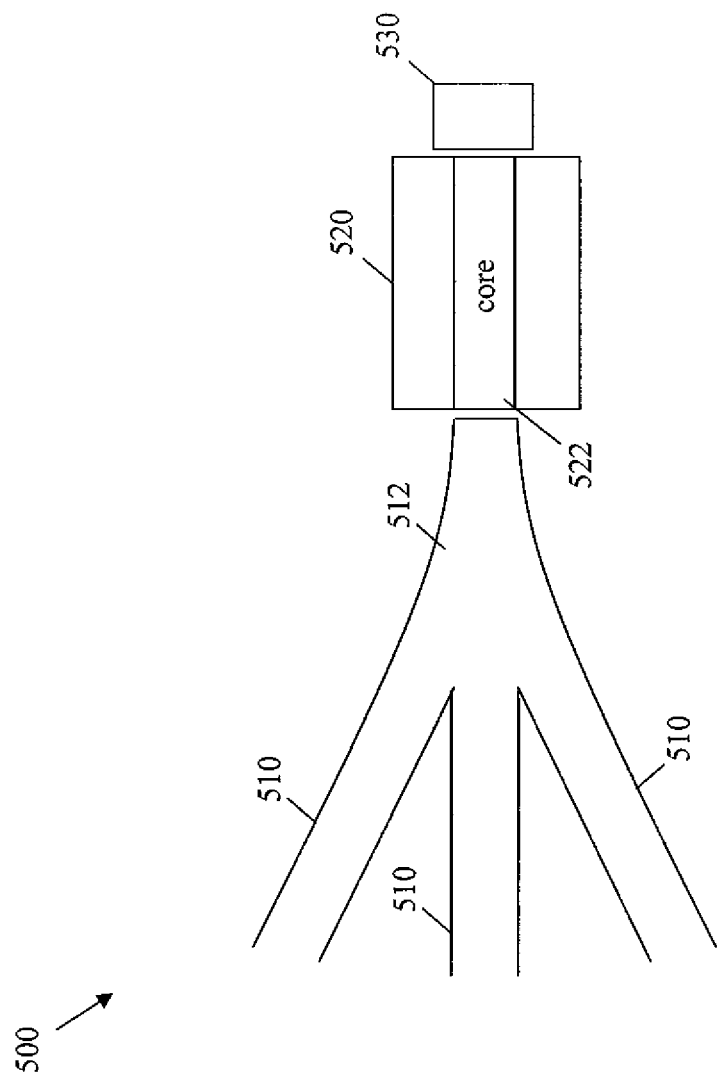
FIG. 5 is a schematic diagram of an embodiment of a fused fiber coupler.

FIG. 5 illustrates an embodiment of a fused fiber coupler 500, which may be another low-loss mode coupling receiver used for mode coupling and detection in a long-reach PON. The fused fiber coupler 500 may comprise at least some of the mode coupling and detection components of the long-reach/large-splitting PON 200 and may be used to couple a plurality of upstream optical signals from the ONTs into different optical modes that are detected. The fused fiber coupler 500 may increase the power budget for upstream transmission. The fused fiber coupler 500 may comprise a plurality of first fibers 510, a fused portion 512, a second fiber 520 comprising a core 522, and a detector 530.

The first fibers 510, second fiber 520, and the detector 530 may be configured similar to the corresponding components of the fiber coupler 300. However, the first fibers 510 may be fused at the fused portion 512, which may be coupled to the second fiber 520. Fusing the first fibers 510 may remove an air void between the first fibers 510, where the fused portion 512 may have a cone shape that reduces the combined diameter of the first fibers 510. As such, the fused portion 512 may have a diameter smaller than the second fiber 520, for instance which may be equal to about the core 522 of the second fiber 520. The core 522 may be configured to confine and support the propagation of the modes, e.g. based on internal reflection effect, in the second fiber 520. The fused portion 512 may have a plurality of cores corresponding to the first fibers 510, which may be coupled effectively to the single core of the second fiber 520.

In some embodiments, at least one lens may be positioned between the multi-core fused portion 512 and the multimode second fiber 520 to further improve optical coupling and reduce insertion loss. The cores in the fused portion 512 may be closer to each other and have smaller diameters than in the separate cores of the first fibers 510, and therefore may have more inter-coupling of optical power between another. This inter-coupling between the cores may be tolerated as long as the optical power from all the cores may be substantially coupled into the second fiber 520.

Figure 6:
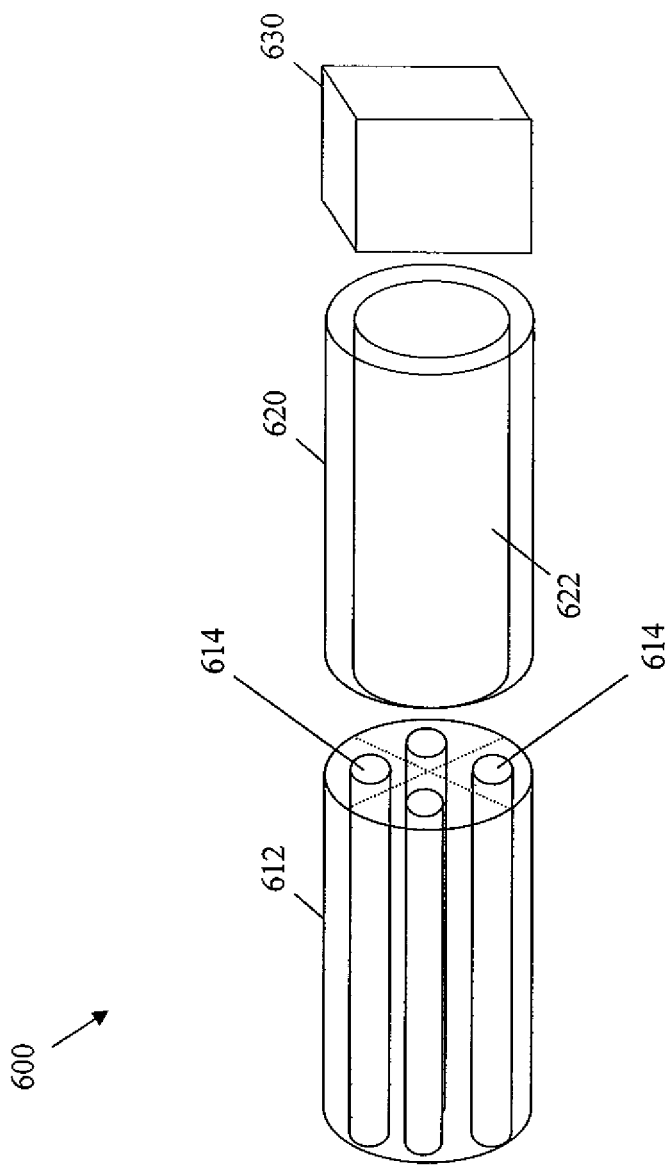
FIG. 6 is a schematic diagram of an embodiment of an improved fused fiber coupler.

FIG. 6 illustrates an embodiment of an improved fused fiber coupler 600, which may be another low-loss mode coupling receiver used for mode coupling and detection in a long-reach PON. Similar to the fused fiber coupler 500, the improved fused fiber coupler 600 may comprise at least some of the mode coupling and detection components of the long-reach/large-splitting PON 200 and may couple a plurality of upstream optical signals from the ONTs into different optical modes. The improved fused fiber coupler 600 may comprise a fused portion 612 comprising a plurality of first cores 614, a second fiber 620 comprising a second core 622, and a detector 630. The fused portion 612, the second fiber 620, and the detector 630 may be configured similar to the corresponding components of the fused fiber coupler 500.

For instance, a plurality of first fibers (not shown), e.g. similar to the first fibers 510, may be fused at the fused portion 612. However, each of the first cores 614 in the fused portion 612, which correspond to the cores of the individual first fibers, may be obtained by removing some of the portion around the core (e.g. cladding) of each first fiber. The cores and remaining portions of the first fibers may be bundled or fused together to obtain the fused portion 612 and the first cores 614. As such, the first cores 614 may be closer to each other than the cores in the fused portion 512 of the fused fiber coupler 500, thereby reducing the overall diameter of the fused portion 612. The combined cross section area of the first cores 614 may also be within the numerical aperture of the second fiber 620, which may result in enhanced optical coupling between the fused portion 612 and the second fiber 620. For example, the combined cross section area of the first cores 614 may be less than or equal to about the cross section area of the second core 622.

Figure 7:
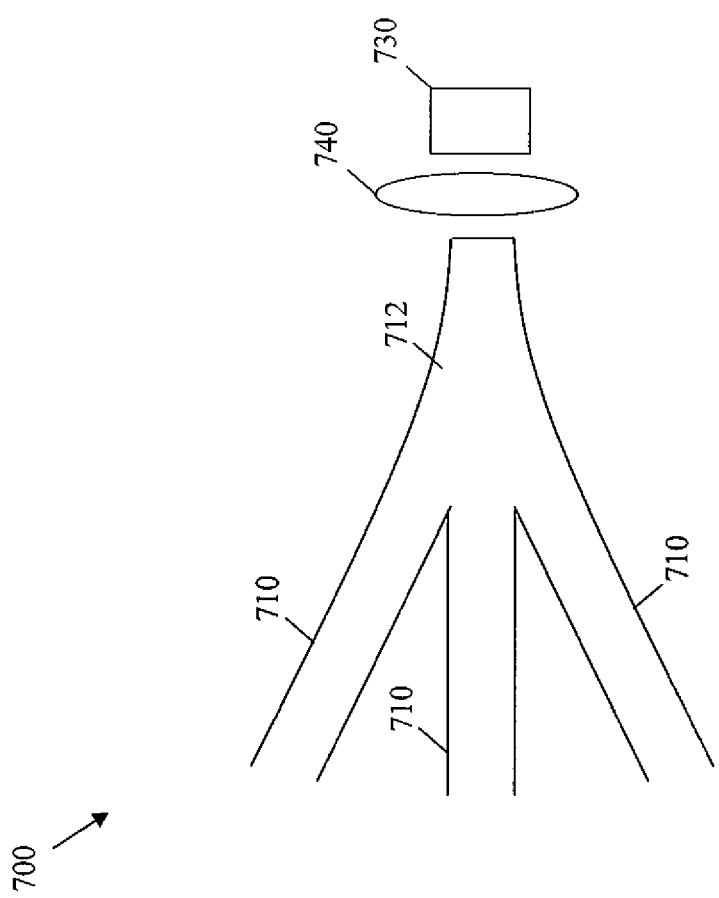
FIG. 7 is a schematic diagram of an embodiment of a fused fiber-lens coupler.

FIG. 7 illustrates an embodiment of a fused fiber-lens coupler 700, which may be another low-loss mode coupling receiver used for mode coupling and detection in the long-reach PON. For instance, the fused fiber-lens coupler 700 may comprise at least some of the mode coupling and detection components in the mode coupler 214 and the Rx 211. Similar to the fused fiber coupler 500, the fused fiber-lens coupler 700 may receive a plurality of upstream optical signals from the ONTs and couple the signals into different optical modes that may be detected. The fused fiber-lens coupler 700 may comprise a plurality of first fibers 710, a fused portion 712, and a detector 730, which may be configured similar to the corresponding components of the fused fiber coupler 500. Additionally, the fused fiber-lens 700 may comprise at least one lens 740, which may be positioned between the fused portion 712 and the detector 730 to improve optical coupling between the two components.

Unlike the mode coupling receivers above, the fused fiber-lens coupler 700 may not comprise a second fiber between the first fibers 710 and the detector 730. Instead the fused portion 712 may be coupled to the detector 730 directly or via the lens 740. As such the optical signals from the first fibers 710 may be forwarded directly to and detected by the detector 730. Excluding the second fiber from the fused fiber-lens coupler 700 may reduce overall losses in the fibers, e.g. by substantially limiting the losses to inter-coupling of optical power between the cores of the first fibers 710 and the fused portion 712.

Figure 8:
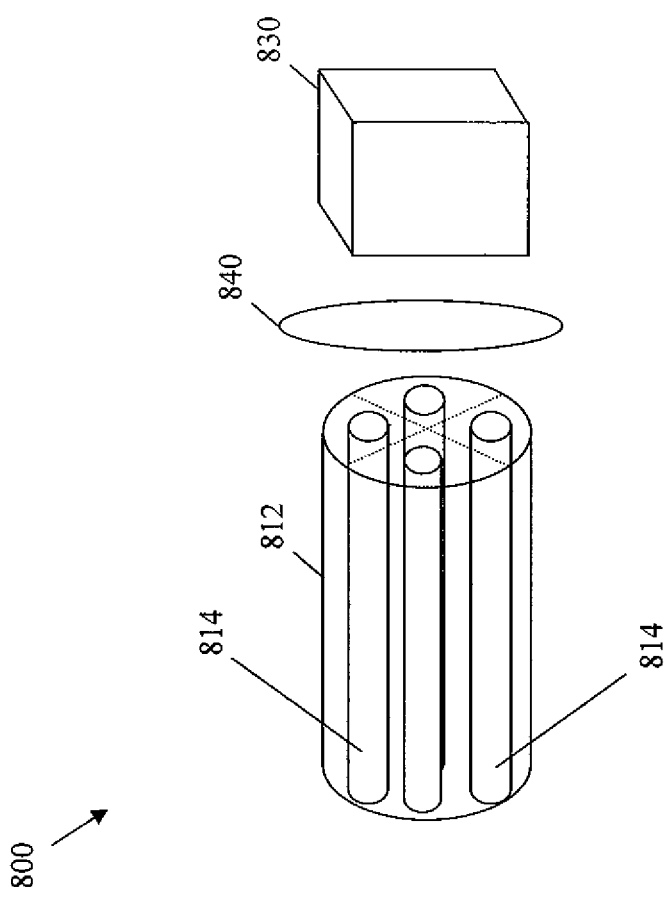
FIG. 8 is a schematic diagram of an embodiment of an improved fused fiber-lens coupler.

FIG. 8 illustrates an embodiment of an improved fused fiber-lens coupler 800, which may be another low-loss mode coupling receiver used for mode coupling and detection in the long-reach PON. The improved fused fiber-lens coupler 800 may comprise a fused portion 812 comprising a plurality of cores 814, a detector 830 that may be directly coupled to the fused portion 812. Additionally, the improved fused fiber-lens coupler 800 may comprise at least a lens 840, which may be positioned between the fused portion the detector 812 and 830 to improve optical coupling between the two components. The components of the improved fused fiber-lens coupler 800 may be configured similar to the corresponding components of the improved fused fiber coupler 600. However, the improved fused fiber-lens coupler 800 may not comprise a second fiber between the fused portion 812 and the detector 830. By eliminating the second fiber from the improved fused fiber-lens coupler 800, the overall optical coupling into the detector 830 may be improved in comparison to the improved fused fiber coupler 600. Further, since the cores 814 of the fused portion 812 may be closer to each other than the cores in the fused portion 712, enhanced optical coupling from the cores 814 may be achieved in comparison to the fused fiber-lens coupler 700.

Figure 9:
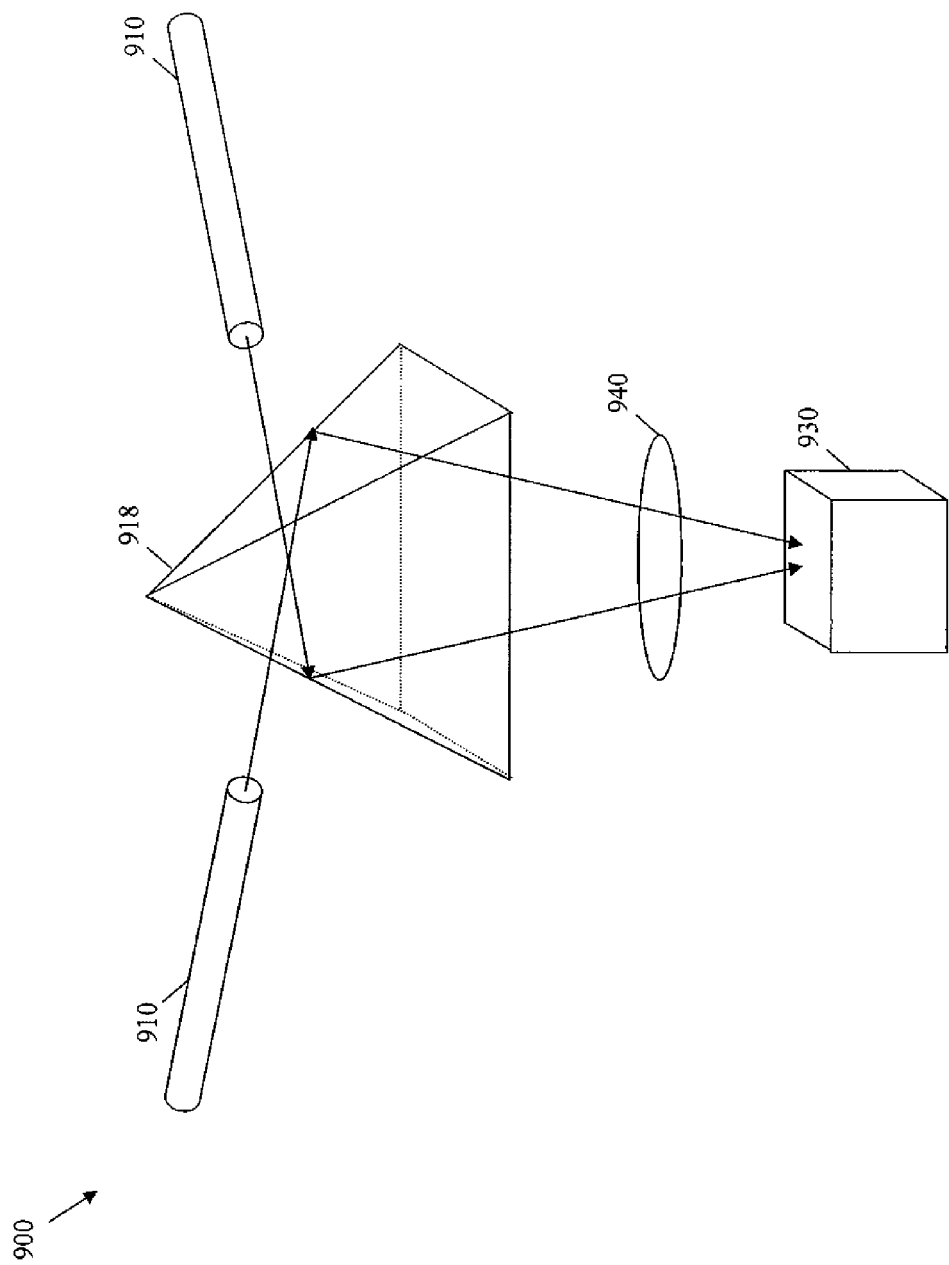
FIG. 9 is a schematic diagram of an embodiment of a prism coupler.

FIG. 9 illustrates an embodiment of a prism coupler 900, which may be another low-loss mode coupling receiver used for mode coupling and detection in the long-reach PON. The prism coupler 900 may comprise at least some of the mode coupling and detection components in the long-reach PON. The prism coupler 900 may comprise a plurality of first fibers 910, a prism 918, and a detector 930. Additionally, the prism coupler 900 may comprise at least one lens 940 between the prism 918 and the detector 930. The prism 918 may be coupled to the first fibers 910. As such, the prism 918 may direct the optical signals towards the detector 930. As shown in FIG. 9, the lens 940 may focus the optical signals onto the surface of the detector 930. The prism 918 may be coupled to about two, about three, or about four first fibers 910, where each first fiber 910 may be aligned with one of the surfaces of the prism 918. As shown in FIG. 9, the prism 918 may have a pyramid shape and comprise about five faces. However, in other embodiments, the prism 918 may have different shapes and may comprise any number of faces, which may be flat or curved. The remaining components of the prism coupler 900 may be configured similar to the corresponding components above.

Figure 10:
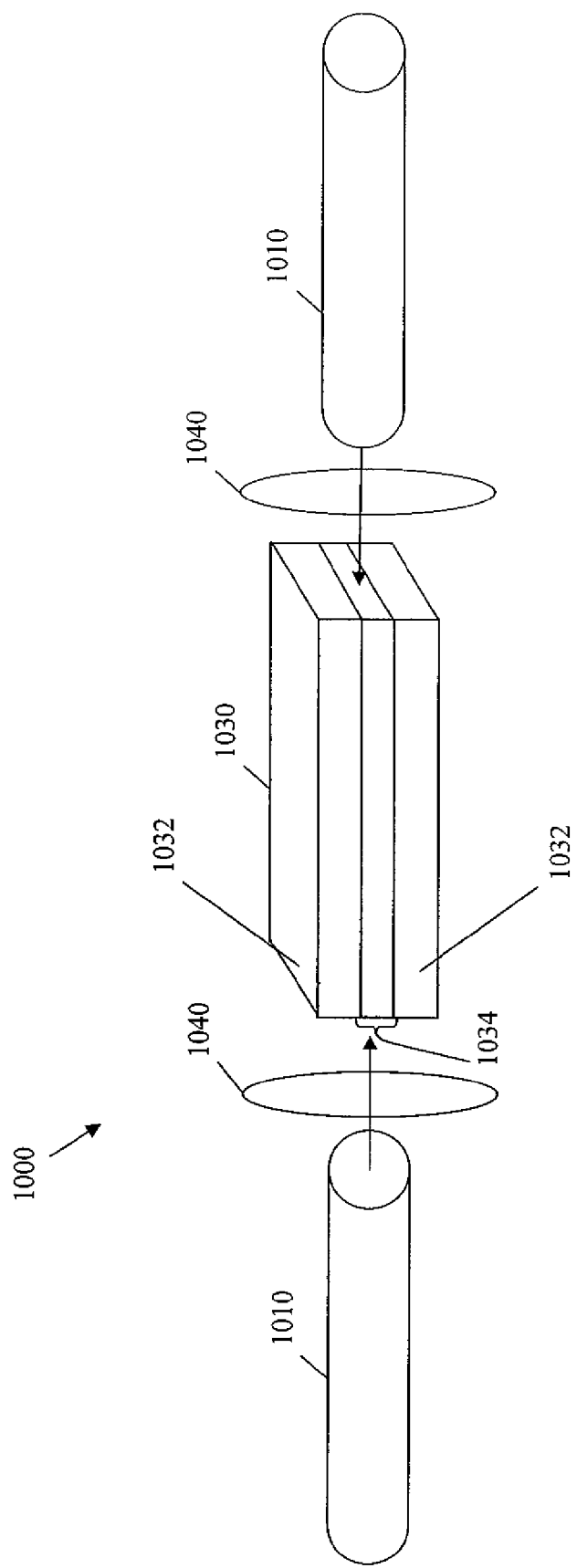
FIG. 10 is a schematic diagram of an embodiment of a waveguide photodiode coupler.

FIG. 10 illustrates an embodiment of a waveguide photodiode coupler 1000, which may be another low-loss mode coupling receiver used for mode coupling and detection in the long-reach PON. The waveguide photodiode coupler 1000 may comprise about two first fibers 1010, a waveguide photodiode 1030, and optionally two lenses 1040 between the first fibers 1010 and the waveguide photodiode 1030. The waveguide photodiode 1030 may be configured to receive the optical signals from the two first fibers 1010 and detect the optical signals. The waveguide photodiode 1030 may comprise two parallel semiconductor sections 1032, e.g. a p-type semiconductor section and an n-type semiconductor section, and an absorptive waveguide 1034 between the two semiconductor plates 1032. The absorptive waveguide 1034 may absorb the optical signals from the two first fibers 1010 and convert the optical energy into electric current. As shown in FIG. 1000, the two first fibers 1010 may be positioned adjacent to the opposite edges of the waveguide photodiode 1030 and may be aligned at about the height of the absorptive waveguide 1034 of the waveguide photodiode 1030 to achieve optical coupling. The remaining components of the waveguide photodiode coupler 1000 may be configured similar to the corresponding components above.

Figure 11:
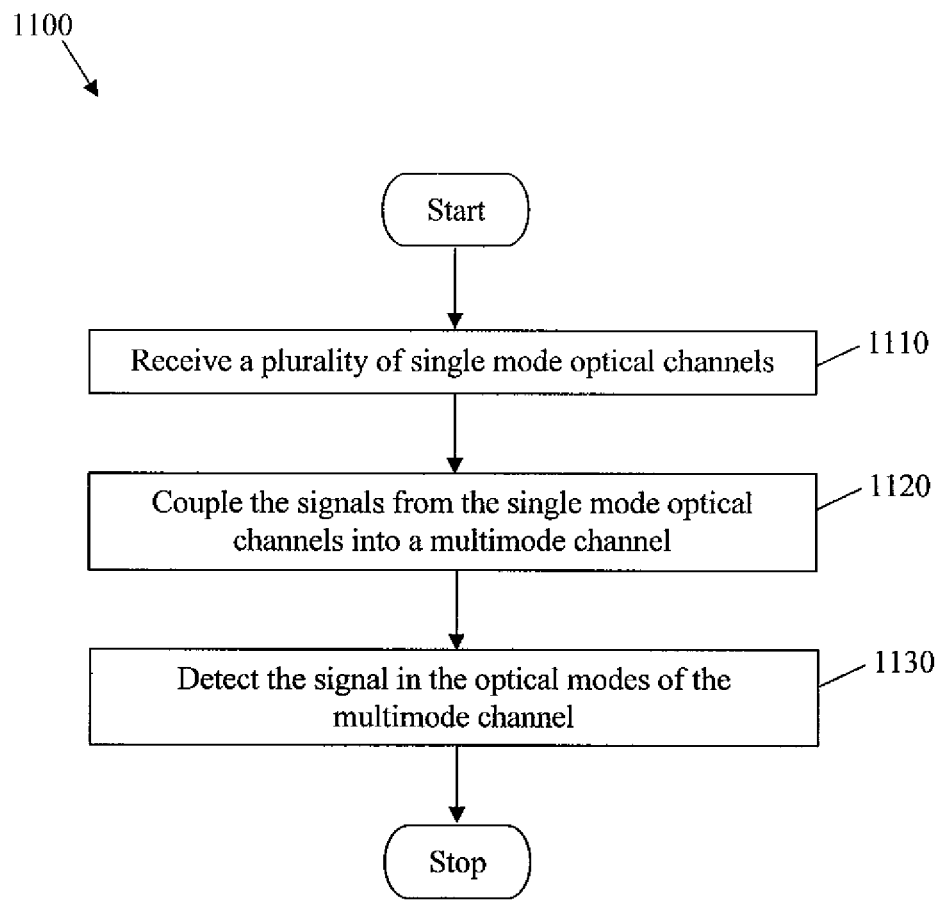
FIG. 11 is a flowchart of an embodiment of a long-reach/large-splitting PON detection method.

FIG. 11 illustrates one embodiment of a long-reach/large-splitting PON detection method 1100. The long-reach/large-splitting PON detection method 1100 may be used in long-reach PON systems to receive communications over extended distances and/or to service an extended number of ONTs in comparison to conventional PON systems. Specifically, the long-reach/large-splitting PON detection method 1100 may be used to improve the power budget for upstream signals from the ONTs to the OLT. For example, the long-reach/large-splitting PON detection method 1100 may be used to establish communications between an OLT and a plurality of ONTs, where the distance between the OLT and the ONTs is greater than or equal to about 20 km. Further, the quantity of ONTs in the system may be greater than or equal to about 32 ONTs. The method 1100 may begin at block 1110, where a plurality of single mode optical channels may be received, e.g. from a plurality of different ONTs. For instance, a plurality of optical signals may be each received at the OLT via separate single mode fibers. Alternatively, at least some of the optical signals may be received via a single fiber.

At block 1120, the signals from the single mode optical channels may be coupled into a multimode channel. For instance, a low-loss mode coupling receiver at the OLT, such as any of the mode coupling receivers, may be used to couple the optical signals from the ONTs into a plurality of corresponding modes in a single multimode fiber or waveguide. Combining the optical signals into a single multimode fiber or waveguide may reduce the overall optical losses in the fibers, and in particular the insertion loss of each optical signal. Reducing the optical losses in the optical signals may provide additional power budget for transmitting the optical signals from the ONTs. The increase in power budget may be used to extend the reach and/or splitting ratio of the optical signals from the ONTs. At block 1130, the signal in the optical modes of the multimode channel may be detected. For instance, a detector may be used to retrieve the data corresponding to the optical channels from the different ONTs. The method 1100 may then end.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
    an optical transmitter configured to transmit a first optical signal to a plurality of optical network terminals (ONTs);
    a first splitter coupled to the optical transmitter and configured to split the first optical signal into a plurality of first signal copies;
    a plurality of second splitters coupled to the first splitter, wherein each second splitter is configured to be positioned between the first splitter and the ONTs, and wherein each second splitter is configured to receive one of the first signal copies from the first splitter, forward the first signal copies to the ONTs in a downstream direction, and forward a plurality of second optical signals received from at least some of the ONTs in an upstream direction;
    a plurality of separators positioned between the first splitter and the second splitters and configured to forward the first signal copies to the second splitters and forward the second optical signals along a plurality of single mode waveguides;
    a mode coupler coupled to the single mode waveguides and configured to receive the second optical signals and combine the second optical signals into a multi-mode waveguide; and
    an optical receiver coupled to the mode coupler via the multi-mode waveguide and configured to detect the second optical signals.

2. The apparatus of claim 1, wherein the mode coupler comprises a prism, wherein each of the single mode waveguides are positioned at and aligned with one of the faces of the prism, and wherein a lens is positioned between the prism and the receiver.

3. The apparatus of claim 1, wherein the quantity of ONTs is larger than or equal to about 64.

4. The apparatus of claim 1, wherein the optical signals are transmitted at a distance larger than or equal to about 20 kilometers.

5. The apparatus of claim 1, wherein the sum of the cross section areas of each of the single mode waveguides is less than the cross section area of the multimode waveguide.

6. The apparatus of claim 1, wherein the single mode waveguides are single mode fibers that have tapered edges coupled to the multimode waveguide, wherein the multimode waveguide is a multimode fiber, and wherein each of the single mode fibers is oriented at an angle less than or equal to about an acceptance angle of the multimode fiber within the mode coupler.

7. The apparatus of claim 1, wherein the mode coupler is located on only one chip, and wherein each of the single mode waveguides is oriented at an angle less than or equal to about an acceptance angle of the multimode waveguide on the chip.

8. The apparatus of claim 1, wherein the single mode waveguides are single mode fibers that have a fused portion coupled to the multimode waveguide within the mode coupler, wherein the multimode waveguide is a multimode fiber, and wherein the diameter of the fused portion is less than or equal to about a diameter of a core of the multimode fiber.

9. The apparatus of claim 1, wherein the single mode waveguides correspond to a plurality of cores in a single fiber, wherein the multimode waveguide is a multimode fiber, and wherein the diameter of the single fiber is less than or equal to about the diameter of the multimode fiber.

10. The apparatus of claim 1, wherein the single mode waveguides are single mode fibers that have a fused portion located in the mode coupler, wherein the diameter of the fused portion is less than or equal to about the cross section area of the optical receiver, and wherein a lens is positioned between the fused portion and the optical receiver.

11. The apparatus of claim 1, wherein the single mode waveguides correspond to a plurality of cores in a single fiber, and wherein a lens is positioned in the mode coupler between the single fiber and the optical receiver.

12. The apparatus of claim 1, wherein the optical receiver is a waveguide photodiode, wherein the single mode waveguides are positioned on opposite edges of the waveguide photodiode and aligned with an absorptive waveguide inside the waveguide photodiode, and wherein the mode coupler comprises a lens is positioned between each of the single mode waveguides and the waveguide photodiode.

13. An apparatus comprising:
an optical transmitter;
a splitter coupled to the optical transmitter;
a plurality of optical separators each coupled to the splitter such that the splitter is positioned between the optical separators and the optical transmitter; and
a mode coupling receiver (MCR) coupled to each of the optical separators,
wherein the optical separators are configured to receive upstream optical signals from an optical distribution network (ODN) via a plurality of first fibers and forward the upstream optical signals to the MCR via a plurality of second fibers, and
wherein the first fibers are configured to bidirectional transmission and the second fibers comprise single mode fibers and wherein the optical separators are configured to receive downstream optical signals from the optical transmitters via a plurality of third fibers and to forward the downstream optical signals to the ODN via the first fibers.

14. The apparatus of claim 13, wherein the MCR is coupled to the optical separators via single mode fibers, wherein the optical transmitter is configured to transmit a first optical signal, wherein the first optical signal does not pass through the single mode fibers, wherein the MCR is configured to receive a second optical signal, and wherein the second optical signal does not pass through the splitter.

15. The apparatus of claim 14, further comprising a plurality of second splitters coupled to the optical separators and to a passive optical network (PON) optical distribution network (ODN) interface, wherein the optical separators are positioned between the second splitters and the splitter, and wherein the optical separators are positioned between the second splitters and the MCR.

16. The apparatus of claim 13, wherein the optical transmitter is configured to transmit optical signals to an optical line terminal (OLT).

17. The apparatus of claim 13, wherein the splitter is configured to split downstream signals from the transmitter into a plurality of downstream signals and is configured to provide a signal loss equal to about ten decibels.

18. The apparatus of claim 13, wherein the MCR is configured to couple the optical signals from the optical separators into a plurality of corresponding modes in a single multimode fiber or waveguide, wherein combining the optical signals into the single multimode fiber or waveguide reduces an overall optical loss in the fibers.

19. The apparatus of claim 1, wherein neither the first optical signals nor the first signal copies pass through the mode coupler, and wherein the second optical signals do not pass through the first splitter.

* * * * *

UNITED STATES PATENT AND TRADEMARK OFFICE
CERTIFICATE OF CORRECTION

PATENT NO. : 8,515,278 B2
APPLICATION NO. : 12/606872
DATED : August 20, 2013
INVENTOR(S) : Ning Cheng and Frank J. Effenberger It is certified that error appears in the above-identified patent and that said Letters Patent is hereby corrected as shown below:

In the claims:

Column 14, lines 23-27, claim 2, should read as:
"2. The apparatus of claim 1, wherein the mode coupler comprises a prism, wherein each of the single mode waveguides are positioned at and aligned with one of the faces of the prism, and wherein a lens is positioned between the prism and the optical receiver."

Column 14, lines 33-35, claim 5, should read as:
"5. The apparatus of claim 1, wherein a sum of cross section areas of each of the single mode waveguides is less than a cross section area of the multimode waveguide."

Column 15, lines 1-7, claim 12, should read as:
"12. The apparatus of claim 1, wherein the optical receiver is a waveguide photodiode, wherein the single mode waveguides are positioned on opposite edges of the waveguide photodiode and aligned with an absorptive waveguide inside the waveguide photodiode, and wherein the mode coupler comprises a lens positioned between each of the single mode waveguides and the waveguide photodiode."

Column 15, lines 8-27, claim 13, should read as:
"13. An apparatus comprising:
an optical transmitter;
a splitter coupled to the optical transmitter;
a plurality of optical separators each coupled to the splitter such that the splitter is positioned between the optical separators and the optical transmitter; and
a mode coupling receiver (MCR) coupled to each of the optical separators,
wherein the optical separators are configured to receive upstream optical signals from an optical distribution network (ODN) via a plurality of first fibers and forward the upstream optical signals to the MCR via a plurality of second fibers, Signed and Sealed this
Twenty-seventh Day of May, 2014

Michelle K. Lee
*Deputy Director of the United States Patent and Trademark Office*

CERTIFICATE OF CORRECTION (continued)
U.S. Pat. No. 8,515,278 B2 wherein the first fibers are configured for bidirectional transmission and the second fibers comprise single mode fibers, and wherein the optical separators are configured to receive downstream optical signals from the optical transmitter via a plurality of third fibers and to forward the downstream optical signals to the ODN via the first fibers."

Column 16, lines 16-19, claim 17, should read as:

"17. The apparatus of claim 13, wherein the splitter is configured to split the downstream optical signals from the optical transmitter into a plurality of downstream signals and is configured to provide a signal loss equal to about ten decibels."